(12) United States Patent
Hochberg et al.

(10) Patent No.: US 10,972,569 B2
(45) Date of Patent: Apr. 6, 2021

(54) APPARATUS, METHOD, AND COMPUTER PROGRAM PRODUCT FOR HETEROGENOUS COMPRESSION OF DATA STREAMS

(71) Applicant: International Business Machines Corporation, Armonk, NY (US)

(72) Inventors: Avishai H. Hochberg, San Jose, CA (US); Hunny W. Kershaw, Capitola, CA (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 15/495,738

(22) Filed: Apr. 24, 2017

(65) Prior Publication Data

US 2018/0309841 A1    Oct. 25, 2018

(51) Int. Cl.
*H04L 29/08* (2006.01)
*H04L 29/06* (2006.01)

(52) U.S. Cl.
CPC ........ *H04L 67/2828* (2013.01); *H04L 67/148* (2013.01); *H04L 69/04* (2013.01); *H04L 69/22* (2013.01)

(58) Field of Classification Search
CPC ... H04L 67/2828; H04L 67/148; H04L 69/04; H04L 69/22
USPC ........................................................ 709/247
See application file for complete search history.

(56) References Cited

U.S. PATENT DOCUMENTS

| | | | |
|---|---|---|---|
| 6,229,546 B1* | 5/2001 | Lancaster | G06T 19/00 |
| | | | 345/419 |
| 7,877,517 B2 | 1/2011 | Mega et al. | |
| 8,423,520 B2 | 4/2013 | Rao et al. | |
| 8,473,428 B2 | 6/2013 | Li et al. | |
| 9,048,862 B2 | 6/2015 | Condict et al. | |
| 9,118,345 B2 | 8/2015 | Wegener | |
| 9,128,951 B1* | 9/2015 | Agrawal | G06F 16/1752 |
| 9,147,374 B2 | 9/2015 | Amit et al. | |
| 9,843,802 B1* | 12/2017 | Wallace | H04N 19/10 |
| 2007/0109156 A1 | 5/2007 | Fallon | |

(Continued)

OTHER PUBLICATIONS

Christian Burns et al., IBM Real-Tim Compression in IBM San Volume Controller and IBM Storwize V700, ibm.com/redbooks, Mar. 2015, 140 pages.

(Continued)

*Primary Examiner* — Joseph L Greene
(74) *Attorney, Agent, or Firm* — Kunzler Bean & Adamson

(57) ABSTRACT

An apparatus for heterogeneous compression of data streams is disclosed. In at least one embodiment, the apparatus includes a sampling module that samples a data stream at one or more intervals to determine a content type for data within the one or more intervals. The apparatus further includes a mapping module that determines whether the content type is linked to a preferred data compression method. The apparatus further includes a processing module that compresses the data within the one or more intervals to produce compressed data using the preferred data compression method in response to determining that the content type is linked to the preferred data compression method. Embodiments of corresponding methods and computer program products are also disclosed.

20 Claims, 5 Drawing Sheets

(56) References Cited

U.S. PATENT DOCUMENTS

| | | | |
|---|---|---|---|
| 2007/0140359 A1* | 6/2007 | Ehret | H04L 1/0083 |
| | | | 375/246 |
| 2013/0138620 A1* | 5/2013 | Yakushev | G06F 16/1752 |
| | | | 707/698 |
| 2014/0095439 A1* | 4/2014 | Ram | G06F 11/1464 |
| | | | 707/640 |
| 2014/0101485 A1* | 4/2014 | Wegener | H03M 7/3068 |
| | | | 714/32 |
| 2014/0195702 A1* | 7/2014 | Seo | H03M 7/3084 |
| | | | 710/53 |
| 2015/0019503 A1* | 1/2015 | Akirav | G06F 16/1748 |
| | | | 707/692 |
| 2016/0253096 A1* | 9/2016 | de la Cruz | G06F 3/064 |
| | | | 710/74 |

OTHER PUBLICATIONS

Larry Coyne et al., IBM Stystem Storage N series Data Compression and Deduplication Data ONTAP 8.1 Operating 8.1 Operating in 7-Mode, Jul. 2012, 110 pages.

Cornel Constantinescu et al., Mixing Deduplication and Compression on Active Data Sets, 2011 Data Compression Conference, IEEE, pp. 393-402.

Martin Scharm, "Comparision-of-compression", Stuff. just for the records, https://binfalse.de/2011/04/04/comparison-of-compression/, Apr. 4, 2011, 9 pages.

\* cited by examiner

APPARATUS, METHOD, AND COMPUTER PROGRAM PRODUCT FOR HETEROGENOUS COMPRESSION OF DATA STREAMS

FIELD

The subject matter disclosed herein relates to an apparatus, method, and computer program product for compression of data streams and more particularly relates to an apparatus for optimizing heterogeneous compression of varying content within data streams.

BACKGROUND

The amount of data being transferred between systems and/or being stored to and restored from backup systems has continued to increase in recent years. Data reduction technologies can help reduce highly redundant data sets. Many types of products including IBM® Spectrum Storage Suite™ may use data deduplication, compression, and incremental "forever" backup technologies to perform data reduction in data protection applications. Systems benefiting from data reduction may operate in virtual, physical, and/or cloud environments. Data reduction in both backup and non-backup applications may be useful.

BRIEF SUMMARY

An apparatus for heterogeneous compression of data streams is disclosed. In at least one embodiment, the apparatus includes a sampling module that samples a data stream at one or more intervals to determine a content type for data within the one or more intervals. The apparatus further includes a mapping module that determines whether the content type is linked to a preferred data compression method. The apparatus further includes a processing module that compresses the data within the one or more intervals to produce compressed data using the preferred data compression method in response to determining that the content type is linked to the preferred data compression method.

A method for heterogeneous compression of data streams is disclosed. In at least one embodiment, the method includes sampling a data stream at one or more intervals to determine a content type for a data sample within the one or more intervals. The method further includes determining whether the content type is linked to a preferred data compression method and compressing data within the one or more intervals to produce compressed data using the preferred data compression method in response to determining that the content type is linked to the preferred data compression method.

A computer program product for performing data heterogeneous compression of different data types is disclosed. In at least one embodiment, the computer program product includes a computer readable storage medium having program instructions that are executable by a processor to cause the processor to perform sampling a data stream at one or more intervals to determine a content type for a data within the one or more intervals that are determined based on one or more deduplication chunk boundaries.

The program instructions are further executable to perform determining whether the content type is linked to a preferred data compression method. The program instructions are further executable to perform compressing the data within the one or more intervals to produce compressed data using the preferred data compression method in response to determining that the content type is linked to the preferred data compression method. The program instructions are further executable to perform compressing the data within the one or more intervals to produce compressed data using a predetermined default compression method in response to determining that the content type is not linked to a preferred data compression method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
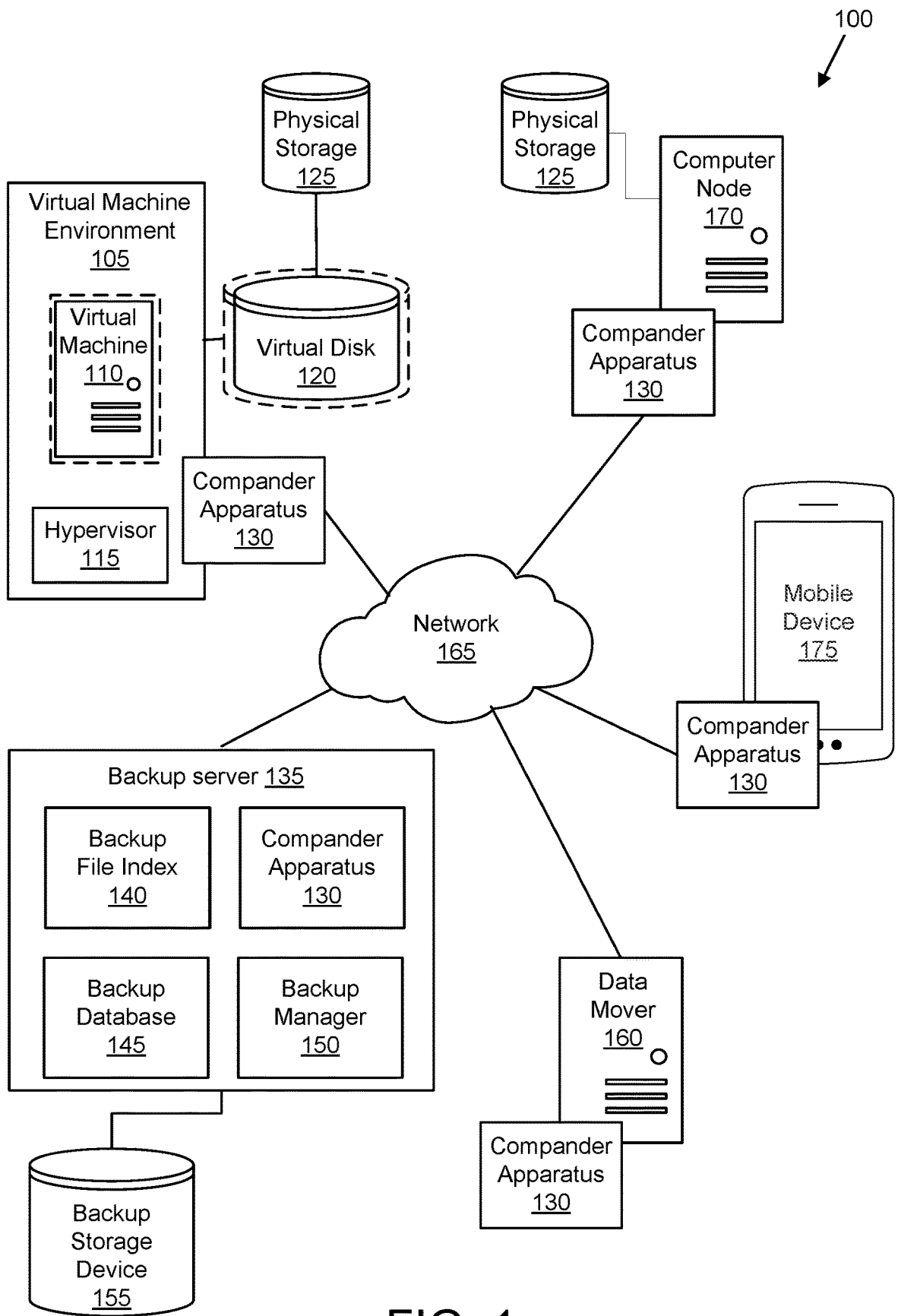
FIG. 1 is a schematic block diagram illustrating a computing environment with at least one apparatus for heterogeneous compression of a data stream in relation to transferring, backing up, and/or accessing data.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating a system 100 for transferring, backing up, and/or accessing data. In some embodiments, the system 100 may include a network 165 that connects one or more computing systems, such as for example, a virtual machine environment 105, a backup server 135, a data mover 160, a computer node 170, and/or a mobile device 175. In some embodiments, any of the computing systems may include one or more embodiments of a compander apparatus 130 for heterogeneous compression and/or decompression of one or more data streams that may have heterogeneous content types. It may be noted that the network 165 may include wired connections and/or wireless connections.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

In some embodiments, the system 100 may include computing systems that store data in files within a file system. For example, one type of computing system may be a virtual machine environment 105. The virtual machine environment 105 may include a hypervisor 115 that creates and runs one or more virtual machines 110. The virtual machines 110 may stream data to a virtual disk 120. In some embodiments, data are streamed as extents or blocks of data and in other embodiments, data are treated as files. The virtual disk 120 may represent a portion of a physical storage 125. Physical storage may be for example, a rotating media hard disk or a solid-state storage device. In some embodiments, the system 100 may further include a compander apparatus 130 associated with the virtual machine environment 105. As used herein, the term compander refers to an apparatus that is capable of compressing data and/or expanding (i.e. decompressing) data.

The compander apparatus 130 may be used to perform data compression on streams of data being transferred between the virtual machine environment 105 and other devices on the network 165. The virtual machine 110 and the virtual disk 120 may have a file system that stores data in different file types depending on a content type of the data. In certain applications, such as for example backup applications, data is transferred between the virtual machine environment 105 and another system, such as for example, backup server 135. In some embodiments, a data mover 160 accepts a request from a backup manager 150 to transfer data from the virtual machine environment 105, the computer node 170, and/or the mobile device 175, to the backup storage device 155 of the backup server 135.

Although in some embodiments, a backup server 135 may access data as files using the respective file system utilities of the virtual machine environment and the backup server, it may be substantially more efficient to access, transfer, backup, and restore, large streams of data as extents or blocks of data where a header with the number of bytes or words in a block of data is transferred and then the actual block of data is transferred. Relative to file-based transfer of data, block transfer of data may reduce the processing load on both the backup server 135 and the client, e.g., virtual machine environment 105, computer node 170, mobile device 175, and so forth.

In some embodiments, the backup server 135 is programmed to perform an incremental backup at specified point-in-time. A point-in-time backup is also known as a snapshot. The backup manager 150 manages the blocks that are incrementally captured to produce multiple recovery points of the entire virtual machine to the end-user. In some embodiments, the backup server 135 includes a backup database 145 that maintains backup information and includes a record of data blocks that have been backed up and provides address information for the backup copies of the data blocks.

The backup server 135 may further include a backup file index 140 which stores and uses information about the attributes, versions, and locations of changed files within the changed blocks that have been copied to the backup storage device 155. It will be noted that references to deleting, updating, designating or performing any operation to files in the backup file index 140 refers to deleting, updating, designating or performing any operation to records corresponding to files as the files themselves are located on the virtual disk 120 and/or the backup storage device 155. In some embodiments, the same or similar types of backup operations could be performed on data from the computer node 170 and/or the mobile device 175.

Although block oriented transfer and/or backup of data streams may be more efficient than file oriented transfer and/or backup, it may be useful to discuss files and content types of data within a file to better understand the various embodiments disclosed in this application. A file in a file system may have a file name and an extension, e.g., "filename.ext". The file name may be chosen to identify a particular file and the extension may be used to identify the content type of the data. For example, in some file systems, a file with binary content type may be stored in a file that has a ".bin" or a ".exe" extension. Files containing media may have various file extensions such as ".mp4", ".wmv", and so forth.

Another content type of data within files may be an "office" content type. For example, a file name to report1.doc, may identify that the content type is a word processing document named "report1". Other content types within files may include images such as compressed photographic images which may have for example a ".jpg" extension to show that the content type is a compressed image. Other content types may be text files, such as encoded text (e.g., ASCII). It may be noted that many types of files exist that use different file extension naming conventions to designate different content types. Further detail about content types is disclosed below with respect to the description of FIG. 4.

In some embodiments, one or more of the computing systems, e.g. virtual machine environment 105, computer node 170, mobile device 175, data mover 160, and/or backup server 135, may be connected over network 165 and may perform data reduction on files or data streams before transferring, backing up, and/or accessing data. One data reduction method used, for example in backup systems, is deduplication. Often within a particular content type of data, a particular sequence of data in a file or data stream may be repeated frequently, or in other words duplicated.

A deduplication process involves identifying and storing unique chunks of data within a particular data stream. The deduplication process may identify chunks of varying sizes and identify chunk boundaries within the file or data stream. As additional data is deduplicated, other chunks of data are compared to the previously stored unique chunks of data and a duplicate chunk of data is replaced with a reference that points to a previously stored chunk of data.

In some embodiments, the one or more compander apparatuses 130 may perform another data reduction method by applying data compression. It may be noted that the one or more compander apparatuses 130 may be implemented in, or used in conjunction with, one computer system, several computer systems, or many computer systems including those types of computer systems shown in FIG. 1.

Figure 2:
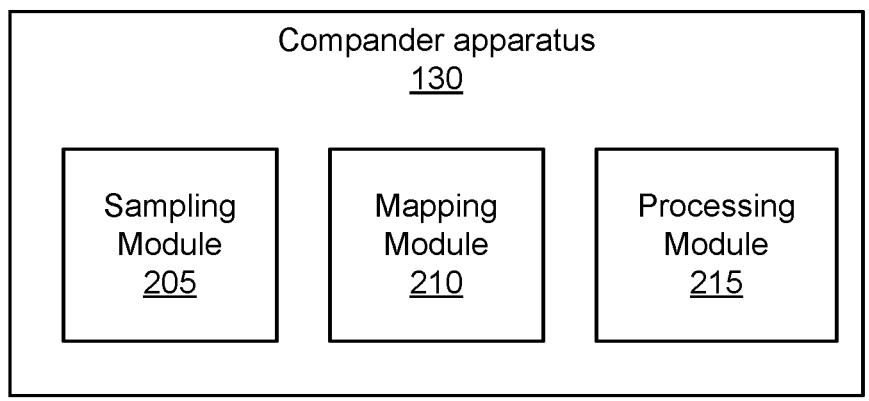
FIG. 2 is a schematic block diagram illustrating one embodiment of a compander apparatus.
Figure 3:
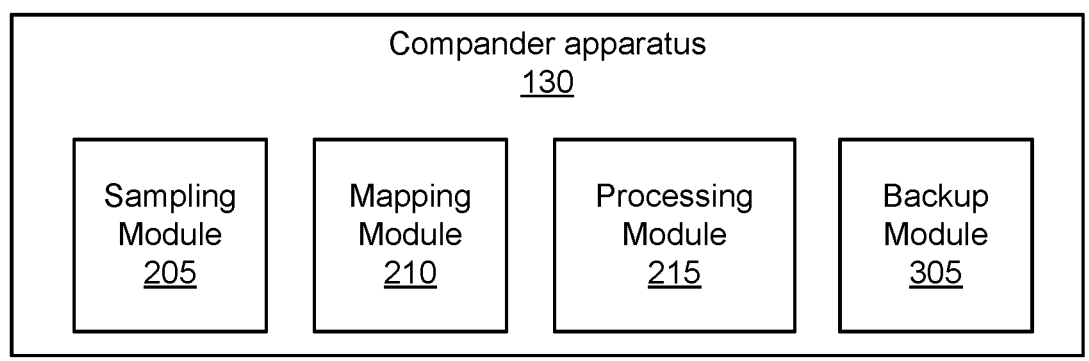
FIG. 3 is a schematic block diagram illustrating another embodiment of a compander apparatus.
Figure 4:
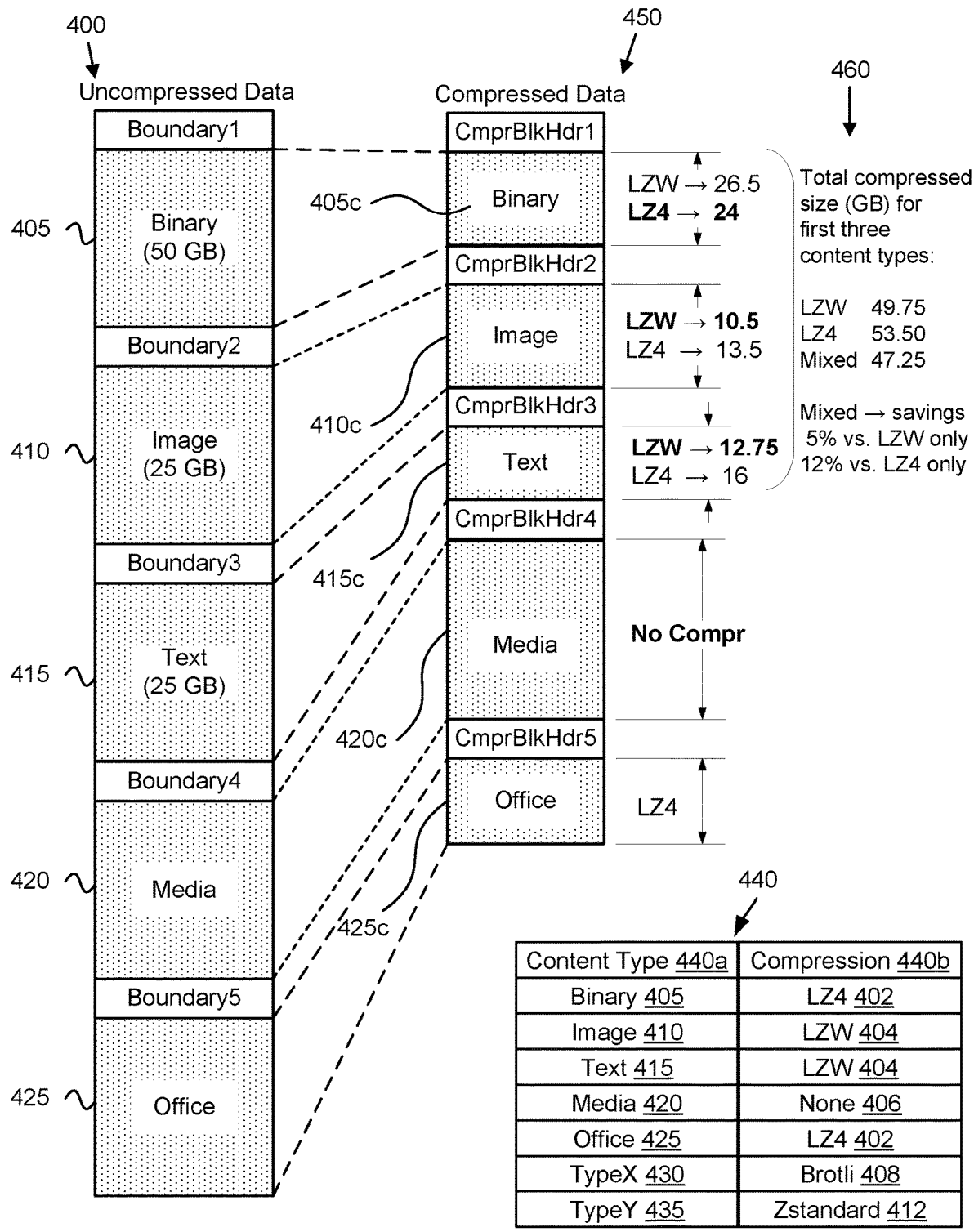
FIG. 4 depicts example embodiments of heterogeneous compression of the data stream with varying types of data.

To facilitate understanding of the compander apparatus 130, it may be useful to refer to FIGS. 2, 3, and 4. FIG. 2 is a schematic block diagram illustrating one embodiment 200 of a compander apparatus 130. FIG. 3 is a schematic block diagram illustrating another embodiment 300 of compander apparatus 130 with a difference being that the embodiment 300 of compander apparatus 130 further includes a backup module 305 that will be explained in more detail below. FIG. 4 depicts an example embodiment of heterogeneous compression of a data stream having varying types of data.

Referring now to FIG. 2 in detail, in at least one embodiment, the compander apparatus 130 includes a sampling module 205 that samples a data stream at one or more intervals to determine a content type for data within the one or more intervals. The compander apparatus 130 further includes a mapping module 210 that determines whether the content type is linked to a preferred data compression method. The compander apparatus 130 further includes a processing module 215 that compresses the data within the one or more intervals to produce compressed data using the preferred data compression method in response to determining that the content type is linked to a preferred data compression method.

Before describing the structure of the sampling module 205, mapping module 210, and processing module 215, and the functions these modules perform, it may be useful to explain some of the ways in which the various embodiments of the compander apparatus 130 improve the operation of computer systems that transfer, store, and/or restore data.

In conventional systems, in addition to or in place of data deduplication, data reduction for any given content type may be performed using a selected data compression method chosen from a variety of available data compression methods. Depending on the content type of the data being compressed, the selected data compression method may yield different efficiencies and compression rates. Some systems implement a compression method that focuses more on minimizing the size of the compressed data. Other systems implement a compression method that focuses more on the speed with which a compression operation is performed, i.e. the compression time. Still other systems use a compression method that focuses on minimizing decompression time.

For example, in some systems, a common content type is "office." In some embodiments is may include portable document format ("pdf" or similar), office suite files such as document (.doc or similar) and/or spreadsheet (.xls or similar) content types. Such systems may include applications in which a particular compression method may be used to compress and/or decompress/restore a compressed file to an uncompressed file. Selecting a first compression method may yield different results been selecting a second compression method with regard to compressed size and/or time required to perform compression/decompression. For example, a 10 Mb file with the "office" content type may be compressed about twice as fast using a LZ4 based compression method than compressing the same "office" file using a gzip compression method with only a modest increase in compressed size.

In conventional compression applications, although a particular compression method may be selected for a particular file or even a data stream, the selected compression method is used throughout the compression process. Using only one compression method for one particular file may be acceptable because the particular file only includes one content type. Moreover, a user of a conventional compression applications may read a file extension and may select by use of a flag or other parameters a particular compression method to apply. As used herein, the term compression method may refer broadly to a method for compressing and/or decompressing data.

Accessing data to be transferred and/or stored as files through a file system may involve more processing and/or data transfer operations than does accessing data in a data stream to be transferred and/or stored as blocks. Moreover, a single block of data to be transferred and/or stored may include multiple files that may have different content types. It may be inconvenient or inefficient to attempt to track or monitor a data stream to detect when one file ends and another file begins. In other circumstances, one file may span several blocks. Thus, for a particular block with a data stream, there may be no file header or extension that indicates the content type within the particular block.

The system 100 may address some of the problems with systems that apply a single compression method to a data stream. The heterogeneous compression apparatuses and methods of system 100 for different content types may provide an improvement to computing systems that enables the systems to more efficiently transfer, backup, and/or restore, streams of data that include multiple content types.

As more data is transferred in the form of data streams between computer systems, a particular data stream may be used to transfer blocks of data that include a number of different content types. If a particular compression method is selected for a heterogeneous data stream, certain blocks of data will be compressed more quickly and/or more densely than will other blocks of data. Accordingly, the compander apparatus 130 is configured to improve data transfer, backup, and restore systems by enabling efficient compression of data streams having heterogeneous content types.

As illustrated in FIG. 2, in one embodiment 200, the compander apparatus 130 includes a sampling module 205 that samples a data stream at one or more intervals to determine a content type for data within the one or more intervals. The sampling module 205 may include instructions or logic that read the data stream to sample it at one or more intervals. The interval for sampling may be determined in a number of ways.

In at least one embodiment, the sampling module 205 determines the one or more intervals using a fixed length such as for example 1 Mb. It may be noted by one of skill in the art that other fixed or variable length intervals may be used with some embodiments.

As previously mentioned, the sampling module 205 further determines the content type for data within the one or more intervals. A first set of instructions or logic may begin by sampling a predetermined number 'N' of bytes of the data stream. In some embodiments, the number 'N' may be fairly small such as for example about 100 bytes. In at least one embodiment, the software and/or logic in the sampling module 205 determines the content type by computing a signature for a predetermined number of bytes within the sample and comparing the computed signature to one or more signature types corresponding to content types that are linked to preferred data compression methods.

In at least one embodiment, the sampling module 205 determines a content type of a data stream by computing a signature for data sampled from a data stream and comparing the computed signature with signatures that have previously been computed on a group of files or data streams having a known data type. One example of code/logic structures that use signatures to identify content types within files or streams of data is Digital Record Object IDentification ("DROID") available from The National Archives, Kew, Richmond, Surrey, TW9 4DU, United Kingdom (website nationalarchives.gov.uk). Another example of code/logic that samples data streams to determine a content type from a computed data signature is TrID (available at mark0.net).

In some embodiments, the sampling module 205 may update the sampling methods and/or intervals used as more types of data or analyzed. In some embodiments, this updating may be performed by the sampling module 205 directly. In other embodiments, the updating may occur in an external data source that is accessed by the sampling module 205. Moreover, as new data fingerprinting methods are developed, such methods may be used by the sampling module 205. One of ordinary skill may use any signature computation and comparison methods known in the art.

In at least one embodiment, the sampling module 205 determines an interval at runtime by detecting that the content type of a current data sample differs from the content type of an immediately preceding data sample. For example, the sampling module 205 may sample a first set of data and compute a first signature and then may compute a second signature on second sample of data that comes later in the data stream by a determined number of bytes.

If the first signature meets a predetermined threshold of comparability with the second signature, this indicates that the content type of data at the first sample is the same content type of data at the second sample. Accordingly, no interval boundary is determined and the sampling process continues until a change in content type is detected. In some embodiments, the preferred compression method selected is selected based on the sampling of data in the interval. Thus, the sampling module 205 may not detect a change in content type until the next sampling point within the intervals.

In still another embodiment, the sampling module 205 of the compander apparatus 130 determines the one or more intervals at runtime based on one or more deduplication chunk boundaries. In some embodiments, the deduplication chunk size may be a number of bytes that is a power of two, For example, in some embodiments, deduplication chunk boundaries may be from 50 KB or less to 4 MB or more. One benefit of determining the one or more intervals based on one or more deduplication chunk boundaries is that in many systems such as backup systems deduplication processing is already being performed. Thus, adding extra instructions or logic at the deduplication boundaries to sample a number of bytes following a deduplication chunk boundary may add less processing time overhead than if the sampling were done at a fixed length interval or at an interval based on changes in the content type. FIG. 3 is a schematic block diagram illustrating another embodiment 300 of a compander apparatus 130. In the embodiment 300, the compander apparatus 130 includes a sampling module 205, a mapping module 210, and a processing module 215 that are substantially as described above with respect to FIG. 2. The compander apparatus 130 of embodiment 300 further includes a backup module 305. The backup module 305 communicates the compressed data to a backup system, such as for example, data mover 160 shown in FIG. 1 or backup server 135 also shown in FIG. 1. The backup server 135 and the data mover 160 may optionally, in some embodiments, include a copy of the compander apparatus 130 to compress or decompress data being transferred.

In some embodiments, the backup module 305 may perform data deduplication operations. The deduplication operations may include fixed block hashing and/or variable block hashing to help determine whether a segment of data is a duplicate. In other embodiments, no deduplication operations are performed or deduplication operations are performed in another system. As previously mentioned one benefit of using the compander apparatus 130 in conjunction with deduplication processing is that deduplication may result in significant data reduction and also provides chunk boundaries at which the compander apparatus 130 may perform sampling, mapping, and processing, to achieve further compression.

Referring again to FIG. 4, a first data stream of uncompressed data 400 includes data having various content types. In some embodiments, a boundary may be determined between each different content type. In at least one embodiment, the content types may be selected from the group consisting of binary 405, image 410, text 415, media 420, office 425 and combinations thereof. Of course, these content types are merely exemplary and any number of content types may be usefully compressed and/or decompressed by the various embodiments of the compander apparatus 130.

Thus, the various computing systems (e.g., 105, 170, 175, 160, 135) depicted in FIG. 1, may represent an improvement over conventional systems with regard to transmitting data streams having heterogeneous content types of data.

The compander apparatus 130 may enable efficient switching to an optimal compression method for heterogeneous content types in a data stream and may beneficially reduce the amount of space needed to store data from the data stream. In cloud computing environments, data may be transferred from a local system to a remote system where it is stored for later retrieval. In cloud computing environments, charges may be incurred for data storage as well as for the amount of data transferred during a backup operation and/or a restore operation.

Moreover, data compression may impact more than merely the costs of backing up and restoring the data. For example, the cost of transferring data between a mobile device and a server or another type of system may be benefited through use of fast and efficient data compression methods that are optimized for the content types of data being transferred.

Referring now to FIGS. 2 and 4, in the embodiment 200, the compander apparatus 130 includes a mapping module 210 that determines whether the content type of data sampled by the sampling module 205 is linked to a preferred data compression method. To better understand the structure of the mapping module 210 shown in FIG. 2, it may be useful to refer also to FIG. 4.

FIG. 4 includes data stream of uncompressed data 400 and a data stream of compressed data 450. As described above with respect to FIG. 2, the uncompressed data stream in the example illustrated, includes five heterogeneous content types where the boundary types (Boundary1-Boundary5) may be determined at fixed—length boundaries, boundaries determined by detecting a change in content type, or boundaries that correspond to the duplication chunk boundaries.

In the embodiment illustrated in FIG. 4, the data stream of uncompressed data 400 has heterogeneous content types. For example, the binary content type 405 depicted may include executable code or any type of binary file. The mapping module 210 determines whether the content type, e.g., binary content type is linked to a preferred data compression method. In at least one embodiment, this is done using a lookup table 440. Various content types 440a may be linked to a preferred compression method 440b. In the example, the binary content type 405 is linked to the LZ4 compression method 402.

Referring briefly again to the embodiment illustrated in FIG. 2, the compander apparatus 130 further includes a processing module that compresses the data in the data stream (e.g., the uncompressed data 400) within the one or more intervals (e.g. the interval defined between boundaries such as for example Boundary1 and Boundary2 in a case of the binary content type 405) to produce compressed data (e.g. compressed binary data 405c in the compressed data stream 450) in response to determining that the content type, e.g., binary content type 405 is linked to a preferred data compression method LZ4 402).

One example illustrated in FIG. 4 may be a computing system such as a Microsoft Windows® computing system. Considering, for the moment, just the first three content types shown, the example computing system has 50 GB of binary content type 405 such as application extensions, applications, and system files. The example system also has a 25 GB of image content type 410 such as medical images. The example system also has 25 GB of text content type 415, such as e-books. Thus, in the example, the total size of the uncompressed data 400 to be transferred e.g., for backup, equals 100 GB.

A compander apparatus 130 may be used to compress the uncompressed data before transferring it so as to reduce the number of bytes to be transferred. The sampling module 205 of the compander apparatus 130 samples the uncompressed data 400 in the data stream to determine the content type. The mapping module accesses table 440 to determine whether the sampled content type is linked to a preferred compression method, and the processing module 215 compresses the uncompressed data 400 to produce compressed data 450 in response to determining that the content type is linked to a preferred data compression method.

In the example, the compressed data 450 is shown with the size of the compressed data shown for an LZW compression method 404 and for an LZ4 compression method 402. The uncompressed binary data 405 is compressed from 50 GB to 26.5 GB if the LZW compression method 404 is used and to 24 GB if the LZ4 compression method 402 is used. Thus, in the example, table 440 links a binary content type 405 to a preferred LZ4 compression method 402. Similarly, image content type 410 is linked to a preferred LZW compression method 404, and text content type 415 is linked to a preferred LZW compression method 404. The media content type 420 is linked to a "none" preferred compression type 406, meaning that no compression beyond that already included in the media content is to be performed.

A summary of example results 460 compares the total size of the compressed data 450 for the first three content types (binary, image, text). If the LZW compression method 404 were used to compress all three content types, the total would be 49.75 GB. If the LZ4 compression method 402 were used to compress all three content types, the total would be 53.5 GB. The compander apparatus 130 is configured to use mixed heterogeneous compression methods, based on the table 440 accessed by the mapping module 210 so that a preferred compression method 440b is used to compress different content types 440a. In the summary of example results 460, the mixed heterogeneous compression methods results in the compressed data 450 having a total size of 47.25 GB which represents a size savings of about 5% versus the LZW compression method only and about 12% versus the LZ4 compression method only.

The preferred compression method 440b that is linked to a particular content type 440a may be selected based on existing databases or may be computed empirically and made accessible to the mapping module 210. In some embodiments, as illustrated in table 440, it may be preferable to use no compression at all. For example, media content type 420, such as MP4 video, may be already compressed so that the processing time use in compressing the media content type 420 would achieve little size reduction. Thus, the preferred compression type may be "none" 406. Other content types 440a may include office content type 425. Arbitrary content types TypeX 430, and TypeY 435 may each be any content type and may be mapped to any preferred compression method. Additional compression methods such as Brotli 408 and Zstandard 412 are shown to illustrate that as new compression types are developed they may be incorporated into the table 440.

In at least one embodiment, the processing module 215 further compresses the data within the one or more intervals using a predetermined default compression method in response to determining that the signature of the current data sample does not correspond to a content type that is linked to a preferred compression method. For example, the LZ4 compression method 409 may be a fast and suitable compression method to use for unknown content types or content types that are not linked to a preferred compression method. Any compression method 440*b* may be selected as a default compression method.

In at least one embodiment, the processing module 215 of the compander apparatus 130 determines the size of the compressed data and inserts a compressed block header that includes a length of a block of compressed data and the compression method used to compress the compressed data. Thus, the compressed data 450 may be transferred as blocks or extents of data.

In at least one embodiment, the processing module 215 is further configured to read a header for an extent within the compressed data, the header including a compression method used for compressing data within the extent and a size of the extent. The processing module 215 is further configured to decompress data within the extent using a decompression method for the compression method used. It may be noted that the same name, e.g., LZ4, Zstandard, LZW, etc., may be used to refer both to the compression method and the decompression method.

Although the same name may be used to refer to both the compression method and the extraction/decompression method, in some cases the compression method is optimized more for fast decompression than it is optimized for fast compression. Asymmetry between the efficiency in speed or size of the compression and decompression method may also be a factor in selecting a preferred compression method for a given content type in a particular application.

In some embodiments, heterogeneous compression/decompression methods may refer to a compression method in which the name of the compression method is the same for heterogeneous data types but that certain selection parameters are changed heterogeneously to optimally compress or decompress heterogeneous data within the intervals. For example, the mapping module 210 may link to different content types to different calls to a Zstandard compression in which a first content type is linked to a Zstandard compression method 412 having a first optimization parameter that is configured to optimize compression results for the first content type. Similarly, the second content type is linked to a Zstandard compression method 412 having a second optimization parameter that is configured to optimize compression results for the second content type.

Thus, using the compander apparatus 130 may improve system performance by providing an advantage that a mixture of heterogeneous compression methods including compression methods may different by the passing of a particular optimization parameter may be done on data streams in real-time without incurring the inefficiencies of using a single compression method for heterogeneous content types.

Figure 5:
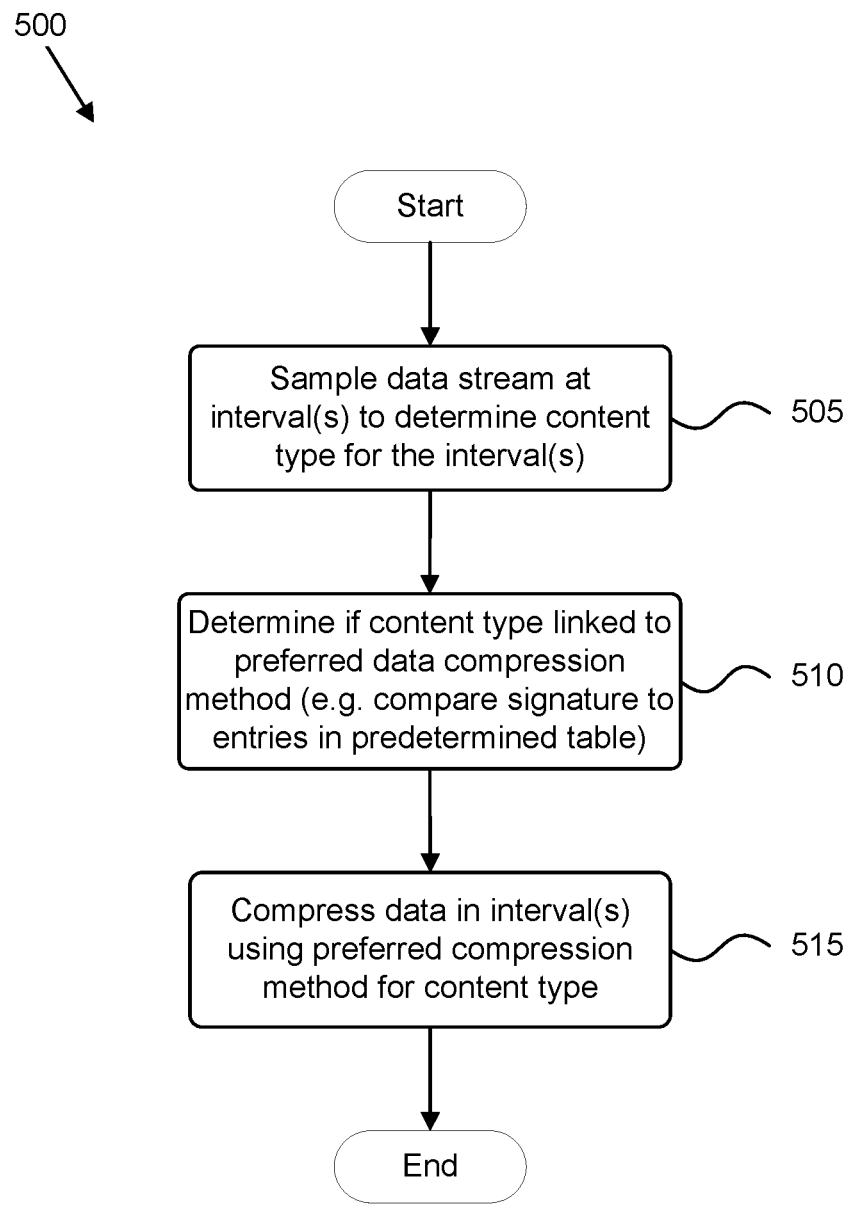
FIG. 5 is a schematic flow chart diagram illustrating one embodiment of a method for heterogeneous compression of a data stream with varying types of data.

FIG. 5 is a schematic flow chart diagram illustrating one embodiment of a method 500 for heterogeneous compression of a data stream with varying types of data. In at least one embodiment, the method begins and includes sampling 505 a data stream at one or more intervals to determine a content type for data within the one or more intervals. In at least one embodiment, the boundaries of the intervals may be determined substantially as described above with respect to FIGS. 2, 3 using fixed length intervals, intervals determined by changes in content type, and/or intervals based on deduplication chunk boundaries.

In embodiment, the method 500 continues and includes determining 510 whether the content type is linked to a preferred data compression method. Determining 510 whether the content type is linked to a preferred data compression method may be performed substantially as described above with respect to FIGS. 2,3 by comparing a signature computed for the sample data with signatures in a database or a table, such as for example, table 440 shown in FIG. 4. Many different types of data structures to establish a link between a content type and preferred data compression method may be known to a person of ordinary skill, such as for example, tables, linked lists, pointers, and the like.

The method 500 continues and includes compressing 515 data within the one or more intervals to produce compressed data using the preferred data compression method in response to determining that the content type is linked to a preferred data compression method. Many various compression methods described above with respect to FIGS. 2, 3, 4 may be used to implement compressing 515 the data. As compression technology advances and additional methods are available, such compression technology may be used for compressing the data which, as used herein, refers to the ability to perform both compressing and decompressing. In at least one embodiment, the method 500 may be performed using the compander apparatus 130 and one or more of the sampling module 205, mapping module 210, and processing module 215. In some embodiments, the method may be performed using a backup module 305.

Figure 6:
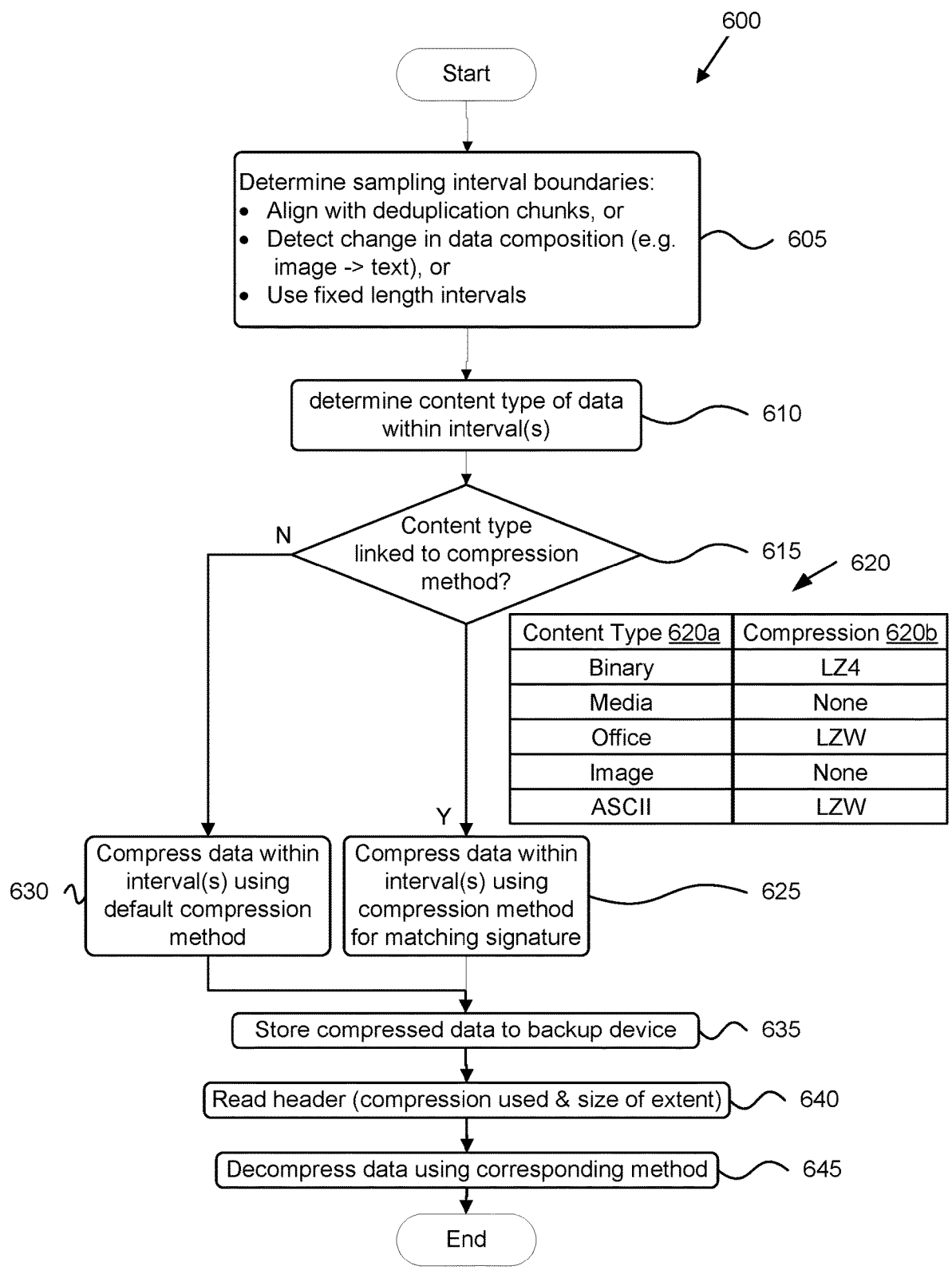
FIG. 6 is a schematic flow chart diagram illustrating another embodiment of a method for heterogeneous compression of a data stream with varying types of data.

FIG. 6 is a schematic flow chart diagram illustrating another embodiment of a method 600 for heterogeneously compressing of a data stream with varying types of data. In at least one embodiment, the method 600 begins and includes determining 605 sampling interval boundaries. A variety of methods for defining sampling interval boundaries may be utilized. For example, in some embodiments, determining 605 the sample boundaries of the one or more intervals may be based on alignment with one or more deduplication chunk boundaries. In other embodiments, determining 605 the one or more sampling interval boundaries is done using a fixed length for the intervals.

In still other embodiments, the one or more intervals are determined by detecting that the content type of a current data sample differs from the content type of an immediately preceding data sample. In this case, a fixed length interval or a deduplication chunk interval may be used to perform an initial sampling and if the content type of a current data sample does not differ from the content type of an immediately preceding data sample then the interval is altered such that what would have been considered two intervals having the same content type is instead considered a single interval.

The method 600 continues and includes determining 610 a content type of the data within the one or more intervals. Determining 610 a content type of the data may be done for example by comparing a signature of the sample data with signatures in a content-type database as described above with respect to FIGS. 2, 3.

The method 600 continues and includes determining 615 whether the content type is linked to the preferred data compression method. Determining 615 whether the content type is linked to preferred data compression method may include comparing a signature of the current data sample to signature types corresponding to content types that are linked to preferred data compression methods. This may be done using a table, such as table 620, or by any of the methods described above with respect to FIGS. 2-5. In some embodiments, the method 600 includes compressing 625 data within the one or more intervals using the preferred data compression method in response to determining that the content type is linked to the preferred data compression method.

As previously explained, the compressing 625 may include compressing and/or decompressing in some embodiments. In response to determining that the content type is not linked to a preferred data compression method, the method continues and includes compressing 630 data within the interval using a default compression method. For example, the LZ4 compression method may be suitable to provide high-speed compression or a wide variety of content types and thus may serve as a suitable default compression method. Any available compression method may be used as a default compression method according to particular application requirements.

In at least one embodiment, the method continues and further includes communicating 635 the compressed data to a backup system. For example, the compressed data may be communicated to a data mover 160, or a backup server 135 as described above with respect to FIG. 1, and the method 600 ends. The method 600 may be implemented using the compander apparatus 130 and any of the sampling module 205, mapping module 210, processing module 215 and/or backup module 305.

In some embodiments, the method 600 may include reading 640 a header that includes a compression method used and a size of an extent that includes the compressed data and decompressing 645 data within the extent using a decompression method for the compression method used. It may be noted, that the method 600 may perform only some of the steps and/or may perform the steps in a different order than depicted in the figures, depending on the application. Implementation of the method may also be accomplished using other hardware and/or software modules.

In some embodiments, the methods 500, 600 may also be implemented in the form of a computer program product for performing data compression of heterogeneous data types. The computer program product may include a computer readable storage medium having program instructions that are executable by a processor to cause the processor to perform sampling a data stream at one or more intervals and determining a content type for a data within the one or more intervals, wherein the intervals are determined based on one or more deduplication chunk boundaries.

The program instructions may further be executable to cause the processor to perform determining whether the content type is linked to a preferred data compression method. The program instructions may further be executable to cause the processor to perform compressing the data within the one or more intervals to produce compressed data using the preferred data compression method in response to determining that the content type is linked to a preferred data compression method, and compressing the data within the one or more intervals to produce compressed data using a predetermined default compression method in response to determining that the content type is not linked to a preferred data compression method.

In some embodiments, the computer program product may further include instructions that are executable by a processor to perform communicating the compressed data to a backup system.

Thus, the apparatuses, methods, and computer program products described herein provide a significant improvement to computing systems by heterogeneously compressing a data stream using preferred compression methods that are suitable for different content types.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a sampling module that:
  samples a data stream a plurality of times at a predetermined incremental amount of data,
  determines a type of data in the data stream at each data sample based on a signature corresponding to the type of data in each data sample,
  compares a first type of data for a current data sample of the data stream to a second type of data for an immediately preceding data sample of the data stream to determine a match, wherein:
   a match is determined in response to a first signature corresponding to the first type of data for the current data sample meeting a predetermined threshold of compatibility for a second signature corresponding to the second type of data for the immediately preceding data sample, and
   a non-match is determined in response to the first signature corresponding to the first type of data for the current data sample not meeting the predetermined threshold of compatibility for the second signature corresponding to the second type of data for the immediately preceding data sample, and
  generates an interval boundary between data types in response to the first type of data for the current data sample not matching the second type of data for the immediately preceding data sample, wherein:
   the interval boundary separates intervals of the data stream including different types of data,
   the data stream includes a plurality of intervals defined by a plurality of interval boundaries,
   at least two intervals in the plurality of intervals include different lengths, and
   the data stream includes a plurality of different types of data; and
 a mapping module that correlates each different type of data within the data stream to a preferred data compression method of a plurality of data compression methods linked to each respective different type of data within the data stream, wherein:
  at least two different data types in the data stream are linked to different preferred data compression methods of the plurality of data compression methods, and
  each data compression method being other than chunk-based data deduplication; and
 a processing module that:
  compresses each different type of data within each interval boundary in the data stream using the preferred data compression method linked to each respective different type of data within the data stream such that a first data type in the data stream is linked to a first preferred data compression method and a second data type in the data stream is linked to a second preferred data compression method that is different from the first preferred data compression method.

2. The apparatus of claim 1, wherein the sampling module further determines a length of each interval defined by the plurality of interval boundaries by detecting that the content type of a current data sample differs from a second content type of an immediately preceding data sample.

3. The apparatus of claim 1, wherein the sampling module further samples a predetermined number of bytes per data sample at each interval defined by the plurality of interval boundaries.

4. The apparatus of claim 1, wherein the sampling module further determines a size of the compressed data and inserts into a data block for transfer to a backup system for block-level backup, a compressed block header corresponding to each compression method boundary comprising a length of the compressed and the preferred data compression method used to compress the compressed data.

5. The apparatus of claim 4, further comprising a backup module that communicates the data block with the compressed block header and compressed data to the backup system for block level backup.

6. The apparatus of claim 1, wherein the mapping module determines whether a content type for the current data sample is linked to the preferred data compression method by comparing the signature of the current data sample to signatures types corresponding to content types that are linked to preferred data compression methods.

7. The apparatus of claim 6, wherein the processing module further compresses the data within the one or more intervals using a predetermined default compression method in response to determining that the signature of the current data sample does not correspond to a content type that is linked to a preferred compression method.

8. The apparatus of claim 1, wherein a content type for the current data sample is selected from the group consisting of binary, media, office, images, text, and combinations thereof.

9. The apparatus of claim 1, wherein the processing module is further configured to:
read a header for an extent within the compressed data, the header comprising a size of the extent and a compression method used for compressing data within the extent; and
decompress data within the extent using a decompression method for the compression method used.

10. A method comprising:
sampling, by a processor, a data stream a plurality of times at a predetermined incremental amount of data;
determining a type of data in the data stream at each data sample based on a signature corresponding to the type of data in each sample;
comparing a first type of data for a current data sample of the data stream to a second type of data for an immediately preceding data sample of the data stream to determine a match, wherein:
a match is determined in response to a first signature corresponding to the first type of data for the current data sample meeting a predetermined threshold of compatibility for a second signature corresponding to the second type of data for the immediately preceding data sample, and
a non-match is determined in response to the first signature corresponding to the first type of data for the current data sample not meeting the predetermined threshold of compatibility for the second signature corresponding to the second type of data for the immediately preceding sample;
generates an interval boundary between data types in response to the first type of data for the current data sample not matching the second type of data for the immediately preceding sample, wherein:
the interval boundary separates intervals of the data stream including different types of data,
the data stream includes a plurality of intervals defined by a plurality of interval boundaries,
at least two intervals in the plurality of intervals include different lengths, and
the data stream includes a plurality of different types of data;
correlating each different type of data within the data stream to a preferred data compression method of a plurality of data compression methods linked to each respective different type of data within the data stream, wherein:
at least two different data types in the data stream are linked to different preferred data compression methods of the plurality of data compression methods, and
each data compression method being other than data deduplication; and
compressing each different type of data within the data stream using the preferred data compression method linked to each respective different type of data within each interval boundary in the data stream such that a first data type in the data stream is linked to a first preferred data compression method and a second data type in the data stream is linked to a second preferred data compression method that is different from the first preferred data compression method.

11. The method of claim 10, wherein the one or more intervals are determined by detecting that a content type of a current data sample differs from the content type of an immediately preceding data sample.

12. The method of claim 10, further comprising sampling a predetermined number of bytes per data sample at one or more intervals.

13. The method of claim 10, wherein determining whether a content type is linked to the preferred data compression method comprises comparing the signature of a current data sample to signature types corresponding to content types that are linked to preferred data compression methods.

14. The method of claim 13, further comprising compressing the data within the one or more intervals using a predetermined default compression method in response to determining that the signature of the current data sample does not correspond to a content type that is linked to the preferred compression method.

15. The method of claim 14, wherein the content types are selected from the group consisting of binary, media, office, images, text, and combinations thereof.

16. The method of claim 15, further comprising determining a size of the compressed data and inserting a header into a data block for transfer to a backup system for block-level backup, the header comprising the preferred compression method used and a size of an extent comprising the compressed data.

17. The method of claim 16, further comprising communicating the data block containing the header and the compressed data to the backup system for block-level backup.

18. The method of claim 15, further comprising:
reading a header that comprises a compression method used and a size of an extent comprising the compressed data; and
decompressing data within the extent using a decompression method for the compression method used.

19. A computer program product for performing data compression of heterogeneous data types, the computer program product comprising a computer readable storage medium having program instructions embodied therewith, wherein the program instructions are executable by a processor to cause the processor to perform:

sampling a data stream a plurality of times at a predetermined incremental amount of data;

determining a type of data in the data stream at each data sample based on a signature corresponding to the type of data in each data sample;

comparing a first type of data for a current data sample of the data stream to a second type of data for an immediately preceding data sample of the data stream to determine a match, wherein:
- a match is determined in response to a first signature corresponding to the first type of data for the current data sample meeting a predetermined threshold of compatibility for a second signature corresponding to the second type of data for the immediately preceding data sample, and
- a non-match is determined in response to the first signature corresponding to the first type of data for the current data sample not meeting the predetermined threshold of compatibility for the second signature corresponding to the second type of data for the immediately preceding sample;

generating an interval boundary between data types in response to the first type of data for the current data sample not matching the second type of data for the immediately preceding sample, wherein:
- the interval boundary separates intervals of the data stream including different types of data,
- the data stream includes a plurality of intervals defined by a plurality of interval boundaries,
- at least two intervals in the plurality of intervals include different lengths, and
- the data stream includes a plurality of different types of data;

correlating each different type of data within the data stream to a preferred data compression method of a plurality of data compression methods linked to each respective different type of data within the data stream, wherein:
- at least two different data types in the data stream are linked to different preferred data compression methods of the plurality of data compression methods, and
- each data compression method being other than chunk-based data deduplication; and compressing each different type of data within the data stream using the preferred data compression method linked to each respective different type of data within each interval boundary in the data stream such that a first data type in the data stream is linked to a first preferred data compression method and a second data type in the data stream is linked to a second preferred data compression method that is different from the first preferred data compression method.

20. The computer program product of claim 19, wherein the program instructions are executable by the processor to further perform determining the one or more intervals by detecting that a content type of the current data sample differs from a content type of the immediately preceding data sample.

* * * * *